US012119591B2

(12) United States Patent
Matsuda et al.

(10) Patent No.: US 12,119,591 B2
(45) Date of Patent: Oct. 15, 2024

(54) SHIELDED FLAT CABLE AND SHIELDED FLAT CABLE WITH CIRCUIT BOARD

(71) Applicant: SUMITOMO ELECTRIC INDUSTRIES, LTD., Osaka (JP)

(72) Inventors: Tatsuo Matsuda, Tochigi (JP); Masamichi Yamamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 420 days.

(21) Appl. No.: 17/649,986

(22) Filed: Feb. 4, 2022

(65) Prior Publication Data

US 2022/0384998 A1 Dec. 1, 2022

(30) Foreign Application Priority Data

May 27, 2021 (JP) ................................ 2021-089356

(51) Int. Cl.
*H01B 7/08* (2006.01)
*H01B 7/02* (2006.01)
(Continued)

(52) U.S. Cl.
CPC ....... *H01R 13/6592* (2013.01); *H01B 7/0208* (2013.01); *H01B 7/0823* (2013.01); *H01R 12/79* (2013.01); *H01R 13/65912* (2020.08)

(58) Field of Classification Search
CPC .. H01B 7/0861; H01B 7/0838; H01B 7/0823; H01B 7/08; H01B 11/002; H01B 11/203; H01B 7/0807; H01B 11/005; H01B 11/1891; H01B 11/1895; H01B 11/1091; H01B 11/00; H01B 11/1066; H01B 13/14; H01B 7/02; H01B 7/0018; H01B 7/0045; H01B 11/1869; H01B 7/17; H01B 7/0208; H01B 7/00; H01B 13/06; H01B 7/18;
(Continued)

(56) References Cited

U.S. PATENT DOCUMENTS 488,193 A * 12/1892 Fischer ............... E04H 17/1404 256/60
3,459,879 A * 8/1969 Gerpheide ............... H01B 7/08 174/117 FF
(Continued)

FOREIGN PATENT DOCUMENTS

JP H0614326 Y2 * 4/1994 ............... H01B 7/08
WO 2019/208247 10/2019

*Primary Examiner* — Krystal Robinson
(74) *Attorney, Agent, or Firm* — IPUSA, PLLC

(57) ABSTRACT

A shielded flat cable includes a first differential signal line pair including mutually parallel first and second signal lines, first and second ground lines parallel to the first differential signal line pair arranged between the first and second ground lines, an insulating layer covering the first differential signal line pair, the first and second ground lines, a first shielding layer covering a first surface of the insulating layer, and a second shielding layer covering a second surface of the insulating layer, opposite to the first surface. The insulating layer includes an opening exposing the first ground line at the first surface of the insulating layer, and the first shielding layer is electrically connected to the first ground line through the opening. A width of the first ground line is greater than a width of each of the first and second signal lines.

16 Claims, 12 Drawing Sheets

(51) Int. Cl.

| | |
|---|---|
| ***H01R 12/79*** | (2011.01) |
| ***H01R 13/6591*** | (2011.01) |
| ***H01R 13/6592*** | (2011.01) |

(58) Field of Classification Search

CPC ...... H01B 11/04; H01B 11/06; H01B 7/1875; H01B 7/0009; H01B 9/02; H01B 7/04; H01B 7/0876; H01B 11/20; H01B 7/041; H01B 13/22; H01B 11/18; H01B 17/56; H01B 7/06; H01B 9/006; H01B 13/0036; H01B 3/20; H01B 7/0216; H01B 7/0846; H01B 7/0869; H01B 9/027; H01B 13/00; H01B 13/01254; H01B 7/0884; H01B 11/02; H01B 11/08; H01B 11/085; H01B 11/1808; H01B 13/0026; H01B 13/012; H01B 13/227; H01B 13/228; H01B 13/24; H01B 13/32; H01B 7/0225; H01B 7/22; H01B 7/24; H01B 7/2825; H01B 7/285; H01B 7/292; H01B 9/003; H01B 9/028; H01B 1/023; H01B 11/12; H01B 11/1834; H01B 11/1839; H01B 13/222; H01B 13/30; H01B 3/025; H01B 3/302; H01B 5/14; H01B 7/0275; H01B 7/1805; H01B 7/223; H01B 7/2806; H01B 7/30; H01B 9/00

See application file for complete search history.

(56) References Cited

U.S. PATENT DOCUMENTS

| | | | | |
|---|---|---|---|---|
| 3,532,800 | A * | 10/1970 | Buehler | H01B 3/485 162/146 |
| 3,576,723 | A * | 4/1971 | Angele et al. | H01B 7/0838 174/117 FF |
| 3,612,743 | A * | 10/1971 | Angele | H01B 7/0838 174/117 FF |
| 3,663,739 | A * | 5/1972 | Chevrier | H01B 7/08 174/32 |
| 6,495,764 | B1 * | 12/2002 | Hori | H01B 7/0861 174/117 F |
| 10,269,469 | B2 * | 4/2019 | Yosui | H01P 3/026 |
| 2007/0240898 | A1 * | 10/2007 | Reichert | H01B 7/0838 174/117 FF |
| 2009/0126972 | A1 * | 5/2009 | Matsushita | H01B 7/0861 174/113 R |
| 2010/0126754 | A1 * | 5/2010 | Koga | H01B 7/0861 174/105 R |
| 2016/0148744 | A1 * | 5/2016 | Sjöberg | H01F 27/14 336/58 |
| 2019/0103203 | A1 * | 4/2019 | Tan | H01B 7/0823 |
| 2019/0371494 | A1 * | 12/2019 | Kojima | H01B 7/0838 |
| 2021/0166836 | A1 * | 6/2021 | Nagano | H01B 11/1091 |
| 2021/0265080 | A1 * | 8/2021 | He | H01B 7/0823 |

* cited by examiner

SHIELDED FLAT CABLE AND SHIELDED FLAT CABLE WITH CIRCUIT BOARD

CROSS-REFERENCE TO RELATED APPLICATIONS

This application is based upon and claims priority to Japanese Patent Application No. 2021-089356 filed on May 27, 2021, the entire contents of which are incorporated herein by reference.

BACKGROUND OF THE INVENTION

1. Field of the Invention

The present disclosure relates to shielded flat cables, and shielded flat cables with circuit boards.

2. Description of the Related Art

A shielded flat cable intended to reduce the susceptibility to external noise and crosstalk, is proposed in International Publication Pamphlet No. WO 2019/208247, for example.

According to the shielded flat cable proposed in International Publication Pamphlet No. WO 2019/208247, the susceptibility to external noise and crosstalk is reduced as intended. However, the frequency of signals that are transmitted increased in recent years, and such signals may become affected by the external noise and the crosstalk.

SUMMARY OF THE INVENTION

According to one aspect of the present disclosure, a shielded flat cable includes a first differential signal line pair including a first signal line and a second signal line that are parallel to each other; a first ground line parallel to the first differential signal line pair; a second ground line parallel to the first differential signal line pair, so that the first differential signal line pair is arranged between the first ground line and the second ground line; an insulating layer covering the first differential signal line pair, the first ground line, and the second ground line; a first shielding layer covering a first surface of the insulating layer; and a second shielding layer covering a second surface of the insulating layer, opposite to the first surface, wherein the insulating layer includes a first opening exposing the first ground line at the first surface of the insulating layer, the first shielding layer is electrically connected to the first ground line through the first opening, and a width of the first ground line is greater than a width of the first signal line and a width of the second signal line.

Other objects and further features of the present disclosure will be apparent from the following detailed description when read in conjunction with the accompanying drawings.

DETAILED DESCRIPTION

Figure 1:
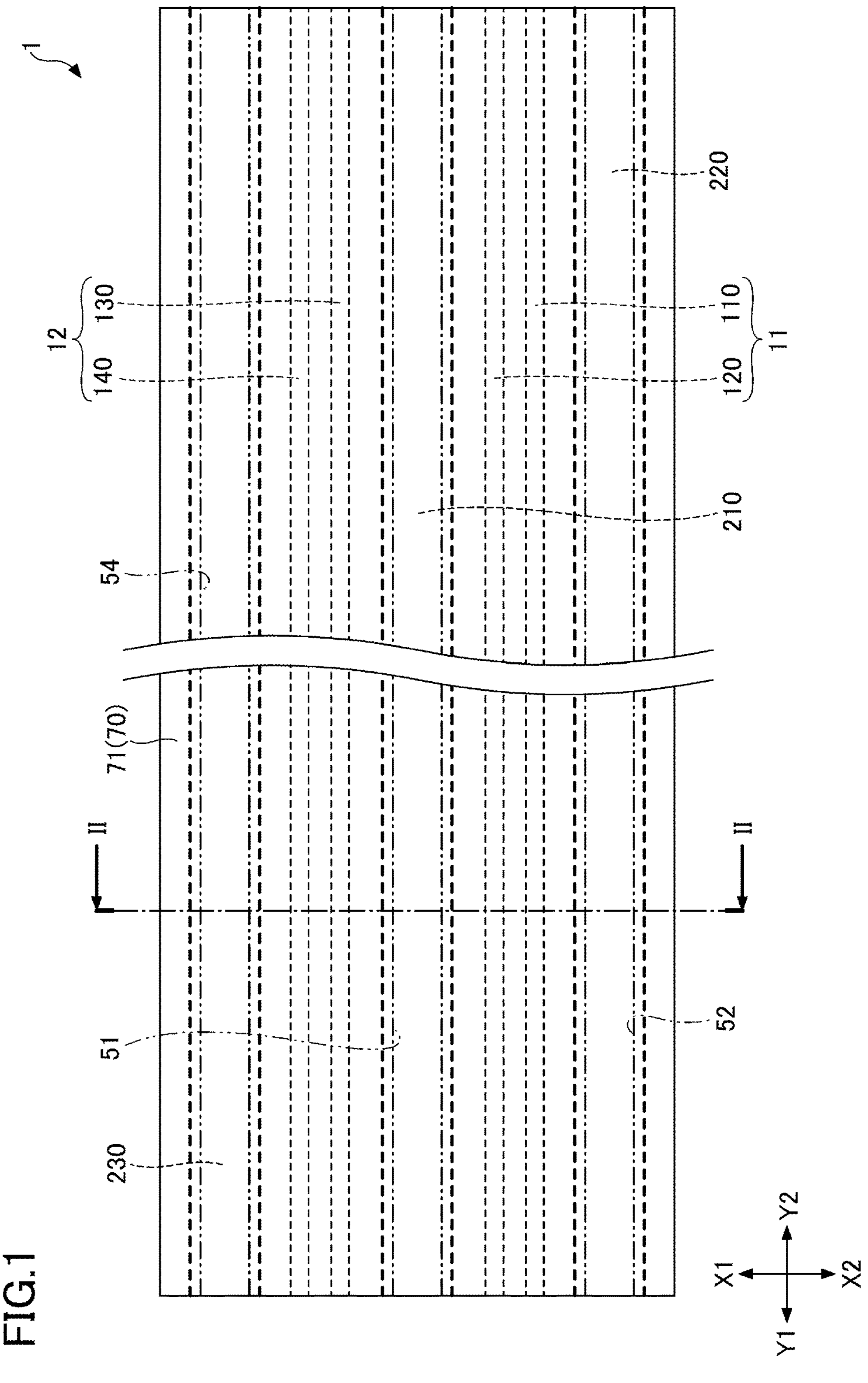
FIG. 1 is a plan view illustrating a shielded flat cable according to a first embodiment.

In shielded flat cables and shielded flat cables with circuit boards, it is desirable to reduce the effects of external noise and crosstalk, even in a high-frequency range (or radio frequency range).

One object according to one aspect of embodiments is to provide shielded flat cables and shielded flat cables with circuit boards, which can reduce the effects of the external noise and the crosstalk, even in the high-frequency range (or radio frequency range).

The embodiments of the present disclosure will first be described in the following.

[1] A shielded flat cable according to one embodiment of the present disclosure includes a first differential signal line pair including a first signal line and a second signal line that are parallel to each other; a first ground line parallel to the first differential signal line pair; a second ground line parallel to the first differential signal line pair, so that the first differential signal line pair is arranged between the first ground line and the second ground line; an insulating layer covering the first differential signal line pair, the first ground line, and the second ground line; a first shielding layer covering a first surface of the insulating layer; and a second shielding layer covering a second surface of the insulating layer, opposite to the first surface, wherein the insulating layer includes a first opening exposing the first ground line at the first surface of the insulating layer, the first shielding layer is electrically connected to the first ground line through the first opening, and a width of the first ground line is greater than a width of the first signal line and a width of the second signal line.

The width of the first ground line is greater than the width of the first signal line and the width of the second signal line. Accordingly, a ground potential of the first ground line is stable, and it is possible to reduce the effects of external noise and crosstalk on the first differential signal line pair even in the high-frequency range.

[2] In the shielded flat cable of [1] above, the first ground line may entirely overlap the second shielding layer through the insulating layer at the second surface of the insulating layer. In this case, it is possible to reduce the number of processes and the cost required to form the opening.

[3] In the shielded flat cable of [1] or [2] above, the insulating layer may include a second opening exposing the second ground line at the second surface of the insulating layer, the second shielding layer may be electrically connected to the second ground line through the second opening, and the second ground line may entirely overlap the first shielding layer through the insulating layer at the first surface of the insulating layer. In this case, the effects of external noise and crosstalk on the first differential signal line pair can easily be reduced.

[4] In the shielded flat cable of [1] above, the insulating layer may include a third opening exposing the first ground line at the second surface of the insulating layer, and the second shielding layer may be electrically connected to the first ground line through the third opening. In this case, the effects of external noise and crosstalk on the first differential signal line pair can easily be reduced.

[5] In the shielded flat cable of [1] above, the insulating layer may include a second opening exposing the second ground line at the second surface of the insulating layer, the second shielding layer may be electrically connected to the second ground line through the second opening, the second ground line may entirely overlap the first shielding layer through the insulating layer at the first surface of the insulating layer, the insulating layer may include a third opening exposing the first ground line at the second surface of the insulating layer, and the second shielding layer may be electrically connected to the first ground line through the third opening. In this case, the effects of external noise and crosstalk on the first differential signal line pair can easily be reduced.

[6] In the shielded flat cable of any one of [1] to [5], the first shielding layer and the second shielding layer may protrude from at least one end of the insulating layer in a cross sectional view along a plane perpendicular to a longitudinal direction, and the first shielding layer and the second shielding layer may be bonded to each other at protruding ends thereof. In this case, it is possible to prevent easy removal of the first shielding layer and the second shielding layer from the insulating layer.

[7] In the shielded flat cable of any one of [1] to [6] above, the width of the first ground line may be greater than a width of the first differential signal line pair. In this case, the ground potential of the first ground line can easily be stabilized, and the effects of external noise and crosstalk on the first differential signal line pair can easily be reduced. Further, when manufacturing the shielded flat cable, it is easy to cause the first shielding layer to make contact with the first ground line.

[8] In the shielded flat cable of any one of [1] to [7] above, a distance between the first differential signal line pair and the first ground line may be greater than a distance between the first signal line and the second signal line. In this case, when manufacturing the shielded flat cable, it is easy to cause the first shielding layer to make contact with the first ground line.

[9] In the shielded flat cable of any one of [1] to [8] above, a width of the first differential signal line pair may be greater than a distance between the first differential signal line pair and the first ground line. In this case, the effects of external noise and crosstalk on the first differential signal line pair can easily be reduced.

[10] In the shielded flat cable of any one of [1] to [9] above, the width of the first ground line may be greater than a distance between the first differential signal line pair and the first ground line. In this case, the ground potential of the first ground line can easily be stabilized, and the effects of external noise and crosstalk can easily be reduced. In addition, when manufacturing the shielded flat cable, it is easy to cause the first shielding layer to make contact with the first ground line.

[11] The shielded flat cable of any one of [1] to [10] above may further include an intervention arranged between the first shielding layer and the insulating layer, wherein the intervention is parallel to the first differential signal line pair and overlaps the first differential signal line pair in a plan view, and the width of the first ground line is smaller than a width of the intervention. In this case, it is possible to easily adjust the impedance of the first differential signal line pair.

[12] The shielded flat cable of any one of [1] to [11] may further include a second differential signal line pair including a third signal line and a fourth signal line that are parallel to the first differential signal line pair, wherein the insulating layer covers the second differential signal line pair, and the first ground line is disposed between the first differential signal line pair and the second differential signal line pair. In this case, the crosstalk between the first differential signal line pair and the second differential signal line pair can be reduced even in the high-frequency range.

[13] A shielded flat cable according to another embodiment of the present disclosure includes a first differential signal line pair including a first signal line and a second signal line that are parallel to each other; a second differential signal line pair including a third signal line and a fourth signal line that are parallel to the first differential signal line pair; a first ground line parallel to the first differential signal line pair; a second ground line parallel to the first differential signal line pair; an insulating layer covering the first differential signal line pair, the second differential signal line pair, the first ground line, and the second ground line; and a shielding layer covering the insulating layer, wherein the first differential signal line pair, the second differential signal line pair, the first ground line, and the second ground line are arranged on a virtual plane, the first ground line is disposed between the first differential signal line pair and the second differential signal line pair, the first differential signal line pair is disposed between the first ground line and the second ground line, the insulating layer includes a first opening reaching the first ground line, and a second opening reaching the second ground line, the first opening is formed only on one side of the first ground line along a first direction perpendicular to the virtual plane, a surface of the first ground line on the other side thereof along a second direction opposite to the first direction is entirely covered by the insulating layer, the second opening is formed only on one side of the second ground line along the second direction, a surface of the second ground line on the other side thereof along the first direction is entirely covered by the insulating layer, the shielding layer is electrically connected to the first ground line through the first opening, and electrically connected to the second ground line through the second opening, and a width of the first ground line and a width of the second ground line are greater than a width of the first signal line, a width of the second signal line, a width of the third signal line, and a width of the fourth signal line.

The width of the first ground line and the width of the second ground line are greater than the width of the first signal line, the width of the second signal line, the width of the third signal line, and the width of the fourth signal line. Accordingly, it is possible to reduce the effects of external noise on the first differential signal line pair, reduce the effects of external noise on the second differential signal line pair, and reduce crosstalk between the first differential signal line pair and the second differential signal line pair, even in the high-frequency range.

[14] A shielded flat cable with a circuit board according to one embodiment of the present disclosure includes the shielded flat cable of any one of [1] to [12] above; the circuit board to which an end of the shielded flat cable is connected, and including a first ground pattern to which the first ground line is electrically connected, a second ground pattern to which the second ground line is electrically connected, and a first signal pattern and a second signal pattern to which the first differential signal line pair is electrically connected; and a resin covering the first ground line, the second ground line, and the first differential signal line pair exposed from the insulating layer at the end of the shielded flat cable, wherein a dielectric constant of the resin is greater than or equal to 2.0, and less than or equal to 2.6. In this case, it is possible to reduce a variation in the impedance.

[15] In the shielded flat cable with the circuit board of [14] above, the first differential signal line pair exposed from the insulating layer may be connected linearly with respect to the first signal pattern and the second signal pattern. In this case, a variation in a characteristic impedance at connecting portions can be reduced, and as a result, it is possible to reduce a reflection loss and reduce a signal deterioration.

[16] In the shielded flat cable with the circuit board of [14] or [15] above, the first ground line exposed from the insulating layer may be connected linearly with respect to the first ground pattern. In this case, the variation in the characteristic impedance at the connecting portions can be reduced, and as a result, it is possible to reduce the reflection loss and reduce the signal deterioration.

Details of Embodiments of the Present Disclosure

The embodiments of the present disclosure will now be described in detail, however, the present disclosure is not limited these embodiments. In the present specification and the drawings, constituent elements having the same or substantially the same function and/or configuration (or structure) will be designated by the same reference numerals, and a repeated description thereof may be omitted. In the present specification and the drawings, an X1-X2 direction, a Y1-Y2 direction, and a Z1-Z2 direction are mutually perpendicular directions. A plane including the X1-X2 direction and the Y1-Y2 direction will be referred to as an XY-plane, a plane including the Y1-Y2 direction and the Z1-Z2 direction will be referred to as a YZ-plane, and a plane including the Z1-Z2 direction and the X1-X2 direction will be referred to as a ZX-plane. For the sake of convenience, the Z1 direction is an upward direction, for example, and the Z2 direction is a downward direction, for example. In the present disclosure, a plan view refers to a view of a constituent element (that is, a target object) from the Z1-side in the Z1-Z2 direction.

First Embodiment

Figure 2:
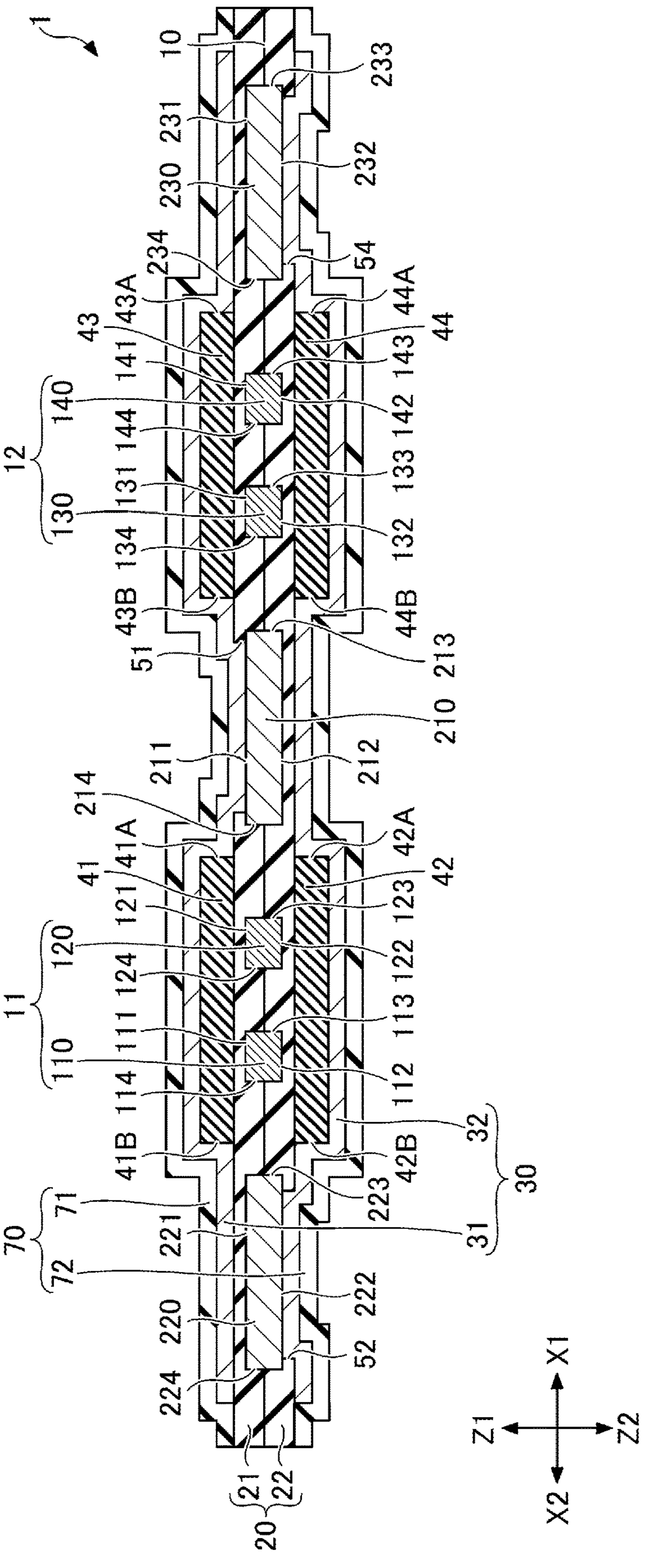
FIG. 2 is a cross sectional view illustrating the shielded flat cable according to the first embodiment.
Figure 3:
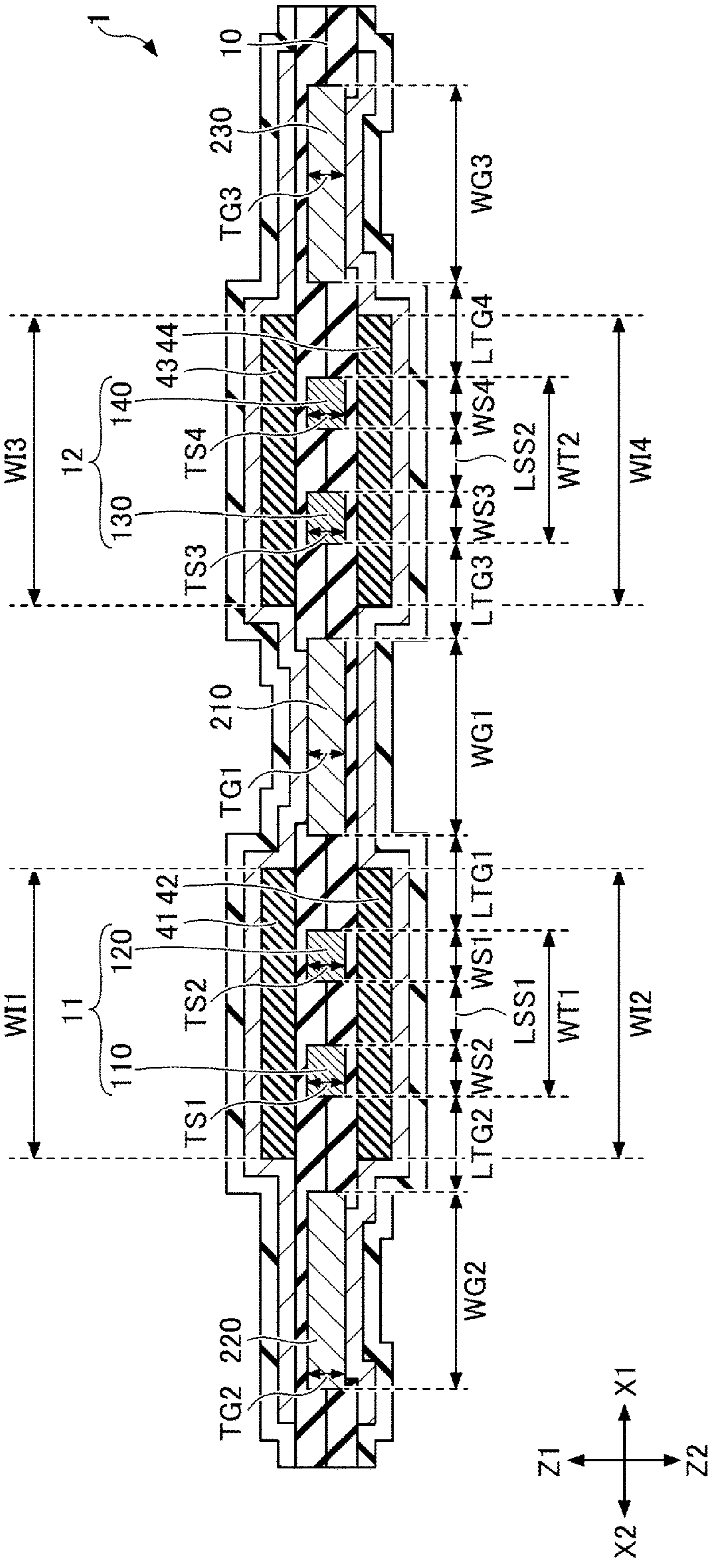
FIG. 3 is a cross sectional view illustrating dimensions of each part illustrated in FIG. 2.

A first embodiment will be described. FIG. 1 is a plan view illustrating a shielded flat cable according to a first embodiment. FIG. 2 is a cross sectional view illustrating the shielded flat cable according to the first embodiment. FIG. 2 corresponds to the cross sectional view along a line II-II in FIG. 1. FIG. 3 is a cross sectional view illustrating dimensions of each part illustrated in FIG. 2.

As illustrated in FIG. 1 and FIG. 2, a shielded flat cable 1 according to the first embodiment includes a first differential signal line pair 11, a second differential signal line pair 12, a first ground line 210, a second ground line 220, and a third ground line 230. The first differential signal line pair 11, the second differential signal line pair 12, the first ground line 210, the second ground line 220, and the third ground line 230 extend in the Y1-Y2 direction, and are arranged in the X1-X2 direction. The Y1-Y2 direction is a longitudinal direction of the shielded flat cable 1, and is a longitudinal direction of each of the first differential signal line pair 11, the second differential signal line pair 12, the first ground line 210, the second ground line 220, and the third ground line 230. For example, the first differential signal line pair 11, the second differential signal line pair 12, the first ground line 210, the second ground line 220, and the third ground line 230 are arranged on a virtual plane 10 parallel to the XY-plane.

The second ground line 220 is located on the X2-side of the first ground line 210, and the third ground line 230 is located on the X1-side of the first ground line 210. Accordingly, the first ground line 210 is arranged between the second ground line 220 and the third ground line 230. The first ground line 210, the second ground line 220, and the third ground line 230 are made of annealed copper with a tin-plated layer formed on a surface thereof, respectively.

The first ground line 210 is a rectangular conductor, for example. The first ground line 210 has a first surface 211, a second surface 212, a third surface 213, and a fourth surface 214. The first surface 211 and the second surface 212 are parallel to the XY-plane, and the third surface 213 and the fourth surface 214 are parallel to the YZ-plane. The second surface 212 is located on the Z2-side of the first surface 211, and the fourth surface 214 is located on the X2-side of the third surface 213. A width WG1 of the first ground line 210 is greater than or equal to 2.0 mm, and less than or equal to 4.0 mm, for example. The width WG1 is a distance between the third surface 213 and the fourth surface 214. A thickness TG1 of the first ground line 210 is greater than or equal to 0.02 mm, and less than or equal to 0.20 mm, for example. The thickness TG1 is a distance between the first surface 211 and second surface 212.

The second ground line 220 is a rectangular conductor, for example. The second ground line 220 has a first surface 221, a second surface 222, a third surface 223, and a fourth surface 224. The first surface 221 and the second surface 222 are parallel to the XY-plane, and the third surface 223 and the fourth surface 224 are parallel to the YZ-plane. The second surface 222 is located on the Z2-side of the first surface 221, and the fourth surface 224 is located on the X2-side of the third surface 223. A width WG2 of the second ground line 220 is greater than or equal to 2.0 mm, and less than or equal to 4.0 mm, for example. The width WG2 is a distance between the third surface 223 and the fourth surface 224. A thickness TG2 of the second ground line 220 is greater than or equal to 0.02 mm, and less than or equal to 0.20 mm, for example. The thickness TG2 is a distance between the first surface 221 and the second surface 222.

The third ground line 230 is a rectangular conductor, for example. The third ground line 230 has a first surface 231, a second surface 232, a third surface 233, and a fourth surface 234. The first surface 231 and the second surface 232 are parallel to the XY-plane, and the third surface 233 and the fourth surface 234 are parallel to the YZ-plane. The second surface 232 is located on the Z2-side of the first surface 231, and the fourth surface 234 is located on the X2-side of the third surface 233. A width WG3 of the third ground line 230 is greater than or equal to 2.0 mm, and less than or equal to 4.0 mm, for example. The width WG3 is a distance between the third surface 233 and the fourth surface 234. A thickness TG3 of the third ground line 230 is greater than or equal to 0.02 mm, and less than or equal to 0.20 mm, for example. The thickness TG3 is a distance between the first surface 231 and the second surface 232.

The first differential signal line pair 11 is arranged between the first ground line 210 and the second ground line 220, and the second differential signal line pair 12 is arranged between the first ground line 210 and the third ground line 230. The first differential signal line pair 11 includes a first signal line 110, and a second signal line 120, and transmits a differential signal. The second signal line 120 is located on X1-side of the first signal line 110. The second differential signal line pair 12 includes a third signal line 130, and a fourth signal line 140, and transmits a differential signal. The fourth signal line 140 is located on X1-side of the third signal line 130. The first signal line 110, the second signal line 120, the third signal line 130, and the fourth signal line 140 are made of non-plated annealed copper having no plated layer famed on a surface thereof, respectively. The first signal line 110, the second signal line 120, the third signal line 130, and the fourth signal line 140 may be made of annealed copper with a tin-plated layer famed on a surface thereof, respectively.

The first signal line 110 is a rectangular conductor, for example. The first signal line 110 has a first surface 111, a second surface 112, a third surface 113, and a fourth surface 114. The first surface 111 and the second surface 112 are parallel to the XY-plane, and the third surface 113 and the fourth surface 114 are parallel to the YZ-plane. The second surface 112 is located on the Z2-side of the first surface 111, and the fourth surface 114 is located on the X2-side of the third surface 113. A width WS1 of the first signal line 110 is greater than or equal to 0.10 mm, and less than or equal to 0.50 mm, for example. The width WS1 is a distance between the third surface 113 and the fourth surface 114. A thickness TS1 of the first signal line 110 is greater than or equal to 0.02 mm, and less than or equal to 0.20 mm, for example. The thickness TS1 is a distance between the first surface 111 and the second surface 112. The first signal line 110 may be a round conductor.

The second signal line 120 is a rectangular conductor, for example. The second signal line 120 has a first surface 121, a second surface 122, a third surface 123, and a fourth surface 124. The first surface 121 and the second surface 122 are parallel to the XY-plane, and the third surface 123 and the fourth surface 124 are parallel to the YZ-plane. The second surface 122 is located on the Z2-side of the first surface 121, and the fourth surface 124 is located on the X2-side of the third surface 123. A width WS2 of the second signal line 120 is greater than or equal to 0.10 mm, and less than or equal to 0.50 mm, for example. The width WS2 is a distance between the third surface 123 and the fourth surface 124. A thickness TS2 of the second signal line 120 is greater than or equal to 0.02 mm, and less than or equal to 0.20 mm, for example. The thickness TS2 is a distance between the first surface 121 and the second surface 122. The second signal line 120 may be a round conductor.

A distance LSS1 between the first signal line 110 and the second signal line 120 is greater than or equal to 0.10 mm, and less than or equal to 2.00 mm, for example. The distance LSS1 is the distance between the third surface 113 of the first signal line 110 and the fourth surface 124 of the second signal line 120.

The third signal line 130 is a rectangular conductor, for example. The third signal line 130 has a first surface 131, a second surface 132, a third surface 133, and a fourth surface 134. The first surface 131 and the second surface 132 are parallel to the XY-plane, and the third surface 133 and the fourth surface 134 are parallel to the YZ-plane. The second surface 132 is located on the Z2-side of the first surface 131, and the fourth surface 134 is located on the X2-side of the third surface 133. A width WS3 of the third signal line 130 is greater than or equal to 0.10 mm, and less than or equal to 0.50 mm, for example. The width WS3 is a distance between the third surface 133 and the fourth surface 134. A thickness TS3 of the third signal line 130 is greater than or equal to 0.02 mm, and less than or equal to 0.20 mm, for example. The thickness TS3 is a distance between the first surface 131 and the second surface 132. The third signal line 130 may be a round conductor.

The fourth signal line 140 is a rectangular conductor, for example. The fourth signal line 140 has a first surface 141, a second surface 142, a third surface 143, and a fourth surface 144. The first surface 141 and the second surface 142 are parallel to the XY-plane, and the third surface 143 and the fourth surface 144 are parallel to the YZ-plane. The second surface 142 is located on the Z2-side of the first surface 141, and the fourth surface 144 is located on the X2-side of the third surface 143. A width WS4 of the fourth signal line 140 is greater than or equal to 0.10 mm, and less than or equal to 0.50 mm, for example. The width WS4 is a distance between the third surface 143 and the fourth surface 144. A thickness TS4 of the fourth signal line 140 is greater than or equal to 0.02 mm, and less than or equal to 0.20 mm, for example. The thickness TS4 is a distance between the first surface 141 and the second surface 142. The fourth signal line 140 may be a round conductor.

A distance LSS2 between the third signal line 130 and the fourth signal line 140 is greater than or equal to 0.10 mm, and less than or equal to 2.00 mm, for example. The distance LSS2 is the distance between the third surface 133 of the third signal line 130 and the fourth surface 144 of the fourth signal line 140.

The width WG1 of the first ground line 210, the width WG2 of the second ground line 220, and the width WG3 of the third ground line 230 are greater than the width WS1 of the first signal line 110, the width WS2 of the second signal line 120, the width WS3 of the third signal line 130, and the width WS4 of the fourth signal line 140.

The shielded flat cable 1 includes an insulating layer 20 that covers the first differential signal line pair 11, the second differential signal line pair 12, the first ground line 210, the second ground line 220, and the third ground line 230. The insulating layer 20 includes a first insulating layer 21 and a second insulating layer 22 which sandwich the virtual plane 10 therebetween. The first insulating layer 21 is located on the Z1-side of the virtual plane 10, and the second insulating layer 22 is located on the Z2-side of the virtual plane 10. The insulating layer 20 has a first surface facing the Z1 direction, and a second surface facing the Z2 direction. The first surface of the insulating layer 20 is formed by the first insulating layer 21, and the second surface of the insulating layer 20 is formed by the second insulating layer 22.

Figure 5:
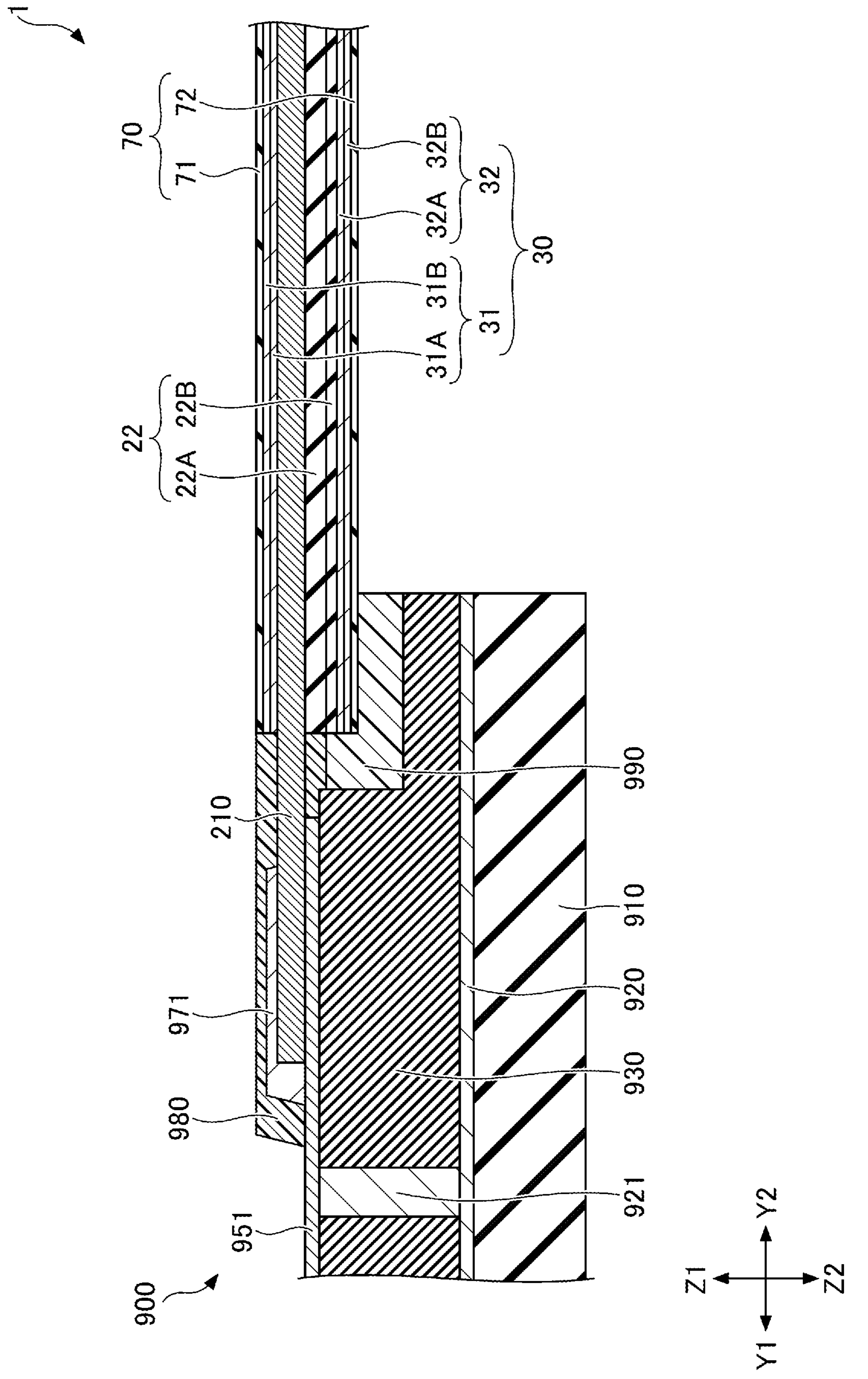
FIG. 5 is a cross sectional view (part 1) illustrating the circuit board to which the shielded flat cable is connected.
Figure 6:
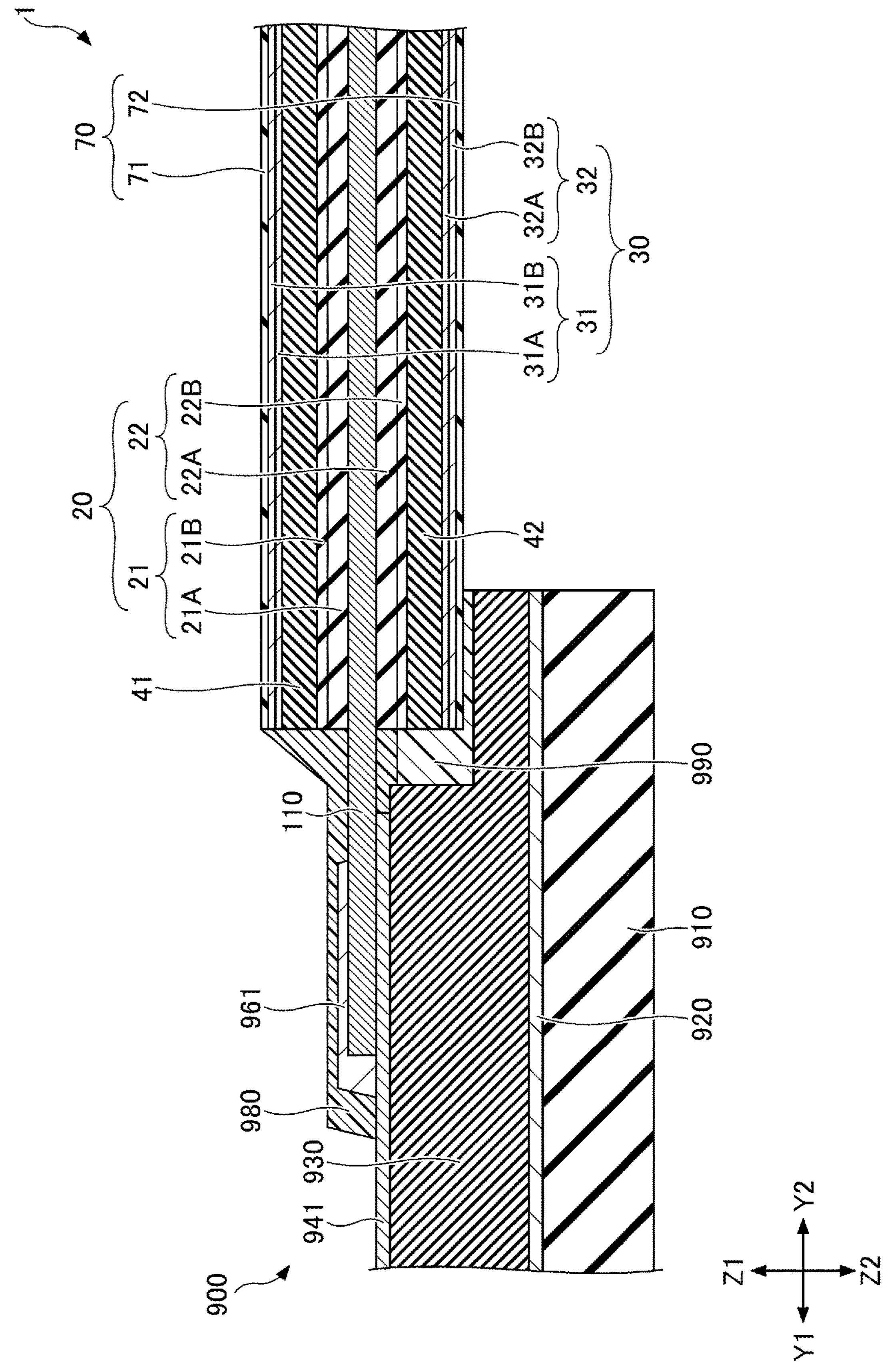
FIG. 6 is a cross sectional view (part 2) illustrating the circuit board to which the shielded flat cable is connected.
Figure 7:
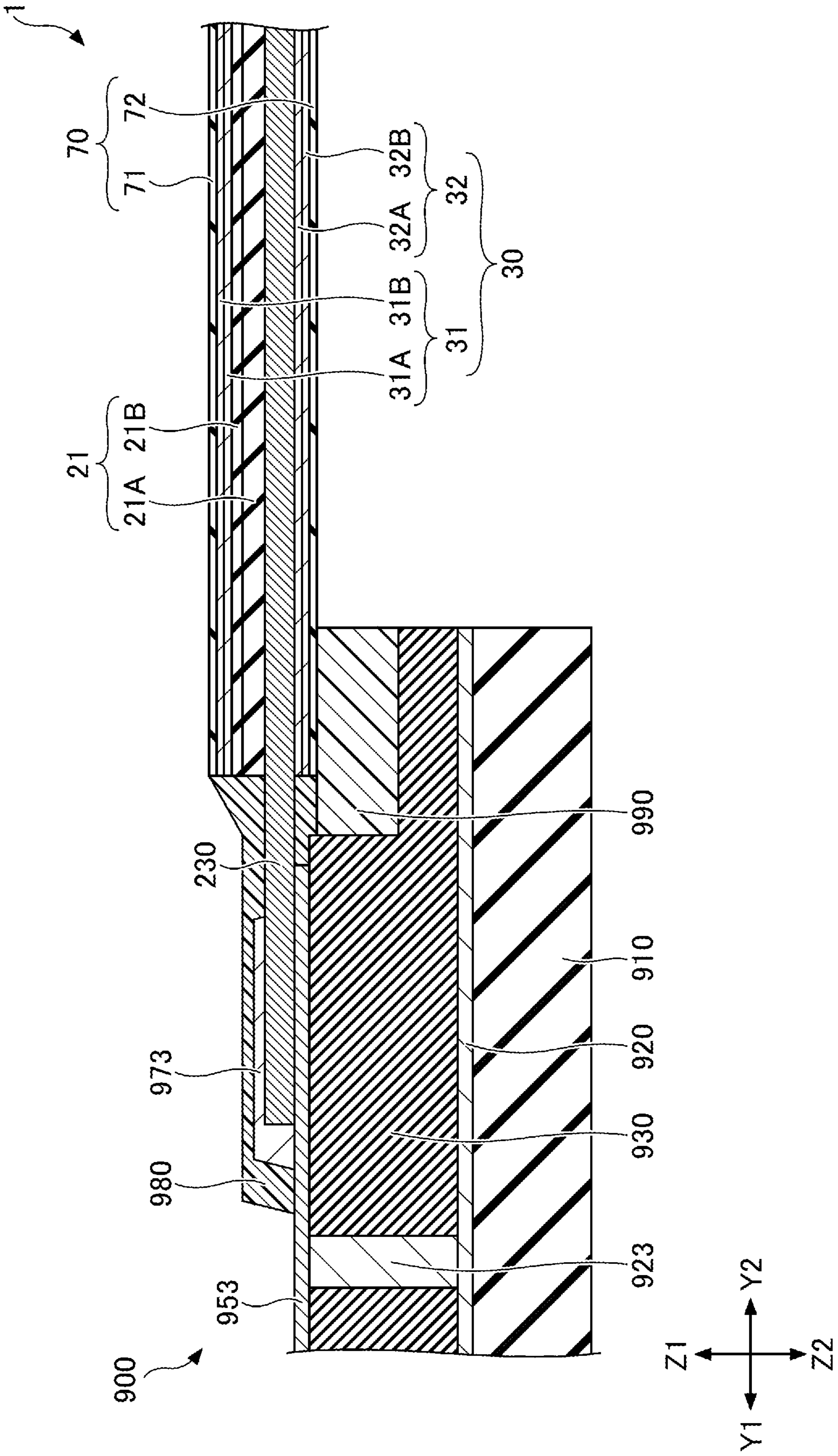
FIG. 7 is a cross sectional view (part 3) illustrating the circuit board to which the shielded flat cable is connected.

As illustrated in FIG. 5 through FIG. 7, the first insulating layer 21 includes a base 21B located on the outer side, and an adhesive layer 21A located on the inner side. The second insulating layer 22 includes a base 22B located on the outer side, and an adhesive layer 22A located on the inner side. Examples of a material used for the bases 21B and 22B include polyester resin, polyphenylene sulfide resin, polyimide resin, or the like, for example. Examples of the polyester resin include polyethylene terephthalate resin, polyethylene naphthalate resin, polybutylene naphthalate resin, or the like. Among these resins, the polyethylene terephthalate resin is preferable from a viewpoint of electrical characteristics, mechanical characteristics, cost, or the like. Examples of a material used for the adhesive layers 21A and 22A include polypropylene-based resin or the like. The first insulating layer 21 and the second insulating layer 22 may have a single layer structure. For example, the first insulating layer 21 and the second insulating layer 22 may be famed solely of resin by extrusion molding.

The shielded flat cable 1 includes a shielding layer 30 provided on the outer side of the insulating layer 20. The shielding layer 30 covers the insulating layer 20. The shielding layer 30 includes a first shielding layer 31 located on the Z1-side of the first insulating layer 21, and a second shielding layer 32 located on the Z2-side of the second insulating layer 22. As illustrated in FIG. 5 through FIG. 7, the first shielding layer 31 includes a metal film 31B, and a conductive adhesive layer 31A. The metal film 31B is a copper film or an aluminum film, for example. As illustrated in FIG. 5 through FIG. 7, the second shielding layer 32 includes a metal film 32B, and a conductive adhesive layer 32A. The metal film 32B is a copper film or an aluminum film, for example. In the first shielding layer 31, the conductive adhesive layer 31A is disposed between the metal film 31B and the first insulating layer 21. In the second shielding layer 32, the conductive adhesive layer 32A is disposed between the metal film 32B and the second insulating layer 22. A thickness of each of the first shielding layer 31 and the second shielding layer 32 is greater than or equal to 0.02 mm, and less than or equal to 0.05 mm, for example.

The shielded flat cable 1 includes a first intervention 41, a second intervention 42, a third intervention 43, and a fourth intervention 44. The first intervention 41, the second intervention 42, the third intervention 43, and the fourth intervention 44 extend in the Y1-Y2 direction, respectively. Examples of a material used for the first intervention 41, the second intervention 42, the third intervention 43, and the fourth intervention 44 include polypropylene-based resin or the like, for example. A sum of the thickness of the first insulating layer 21 and a thickness of the first intervention 41 or the third intervention 43 is less than or equal to 0.4 mm, and a sum of the thickness of the second insulating layer 22 and a thickness of the second intervention 42 or the fourth intervention 44 is less than or equal to 0.4 mm, for example. The first intervention 41, the second intervention 42, the third intervention 43, and the fourth intervention 44 may be omitted.

The first intervention 41 is provided between the first insulating layer 21 and the first shielding layer 31. In the plan view, the first intervention 41 is arranged between the first ground line 210 and the second ground line 220, and overlaps the first differential signal line pair 11. In the plan view, an end 41A of the first intervention 41 on the X1-side is located between the first differential signal line pair 11 and the first ground line 210, and an end portion 41B of the first intervention 41 on the X2-side is located between the first differential signal line pair 11 and the second ground line 220. A width WI1 of the first intervention is greater than or equal to 3.0 mm, and less than or equal to 5.0 mm, for example. The width WI1 is a distance between the end 41A and the end 41B.

The second intervention 42 is provided between the second insulating layer 22 and the second shielding layer 32. Similar to the first intervention 41, in the plan view, the second intervention 42 is provided between the first ground line 210 and the second ground line 220, and overlaps the first differential signal line pair 11. In the plan view, an end 42A of the second intervention 42 on the X1-side is located between the first differential signal line pair 11 and the first ground line 210, and an end 42B of the second intervention 42 on the X2-side is located between the first differential signal line pair 11 and the second ground line 220. A width WI2 of the second intervention is greater than or equal to 3.0 mm, and less than or equal to 5.0 mm, for example. The width WI2 is a distance between the end 42A and the end 42B.

The third intervention 43 is provided between the first insulating layer 21 and the first shielding layer 31. In the plan view, the third intervention 43 is provided between the first ground line 210 and the third ground line 230, and overlaps the second differential signal line pair 12. In the plan view, an end 43A of the third intervention 43 on the X1-side is located between the second differential signal line pair 12 and the third ground line 230, and an end 43B of the third intervention 43 on the X2-side is located between the second differential signal line pair 12 and the first ground line 210. A width WI3 of the third intervention is greater than or equal to 3.0 mm, and less than or equal to 5.0 mm, for example. The width WI3 is a distance between the end 43A and the end 43B.

The fourth intervention 44 is provided between the second insulating layer 22 and the second shielding layer 32. Similar to the third intervention 43, in the plan view, the fourth intervention 44 is provided between the first ground line 210 and the third ground line 230, and overlaps the second differential signal line pair 12. In the plan view, an end 44A of the fourth intervention 44 on the X1-side is located between the second differential signal line pair 12 and the third ground line 230, and an end 44B of the fourth intervention 44 on the X2-side is located between the second differential signal line pair 12 and the first ground line 210. A width WI4 of the fourth intervention is greater than or equal to 3.0 mm, and less than or equal to 5.0 mm, for example. The width WI4 is a distance between the end 44A and the end 44B.

A first opening 51 extending to the first ground line 210 is formed in the first insulating layer 21. The first opening 51 extends in the Y1-Y2 direction, and is formed in a groove shape. The first surface 211 of the first ground line 210 is exposed through the first opening 51. The first shielding layer 31 is connected to the first ground line 210 through the first opening 51. The conductive adhesive layer 31A of the first shielding layer 31 makes contact with the first ground line 210. The entire second surface 212 of the first ground line 210 is covered by the second insulating layer 22.

A second opening 52 extending to the second ground line 220 is formed in the second insulating layer 22. The second opening 52 extends in the Y1-Y2 direction, and is formed in a groove shape. The second surface 222 of the second ground line 220 is exposed through the second opening 52. The second shielding layer 32 is connected to the second ground line 220 through the second opening 52. The conductive adhesive layer 32A of the second shielding layer 32 makes contact with the second ground line 220. The entire first surface 221 of the second ground line 220 is covered by the first insulating layer 21.

A fourth opening 54 extending to the third ground line 230 is formed in the second insulating layer 22. The fourth opening 54 extends in the Y1-Y2 direction, and is formed in a groove shape. The second surface 232 of the third ground line 230 is exposed through the fourth opening 54. The second shielding layer 32 is connected to the third ground line 230 through the fourth opening 54. The conductive adhesive layer 32A of the second shielding layer 32 makes contact with the third ground line 230. The entire first surface 231 of the third ground line 230 is covered by the first insulating layer 21.

The shielded flat cable 1 includes an insulating protective layer 70 disposed on the outer side of the shielding layer 30. The insulating protective layer 70 covers the shielding layer 30. The insulating protective layer 70 includes a first insulating protective layer 71 located on the Z1-side of the first shielding layer 31, and a second insulating protective layer 72 located on the Z2-side of the second shielding layer 32.

Figure 4:
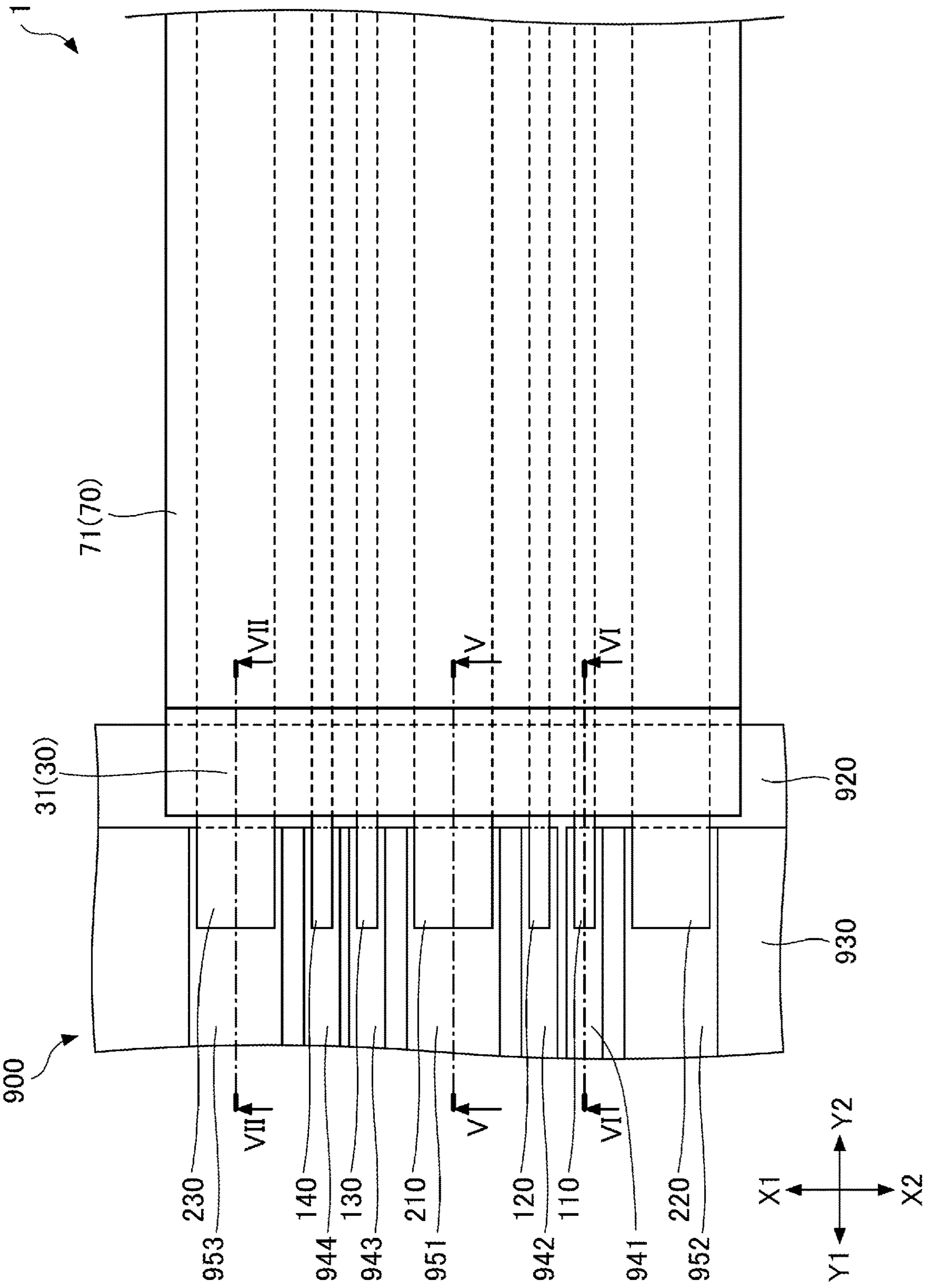
FIG. 4 is a plan view illustrating a circuit board to which the shielded flat cable is connected.

The shielded flat cable 1 is used in a state connected to a circuit board (or wiring board), for example. Next, the connection between the shielded flat cable 1 and the circuit board will be described. FIG. 4 is a plan view illustrating the circuit board to which the shielded flat cable 1 is connected. FIG. 5 through FIG. 7 are cross sectional views illustrating the circuit board to which the shielded flat cable 1 is connected. FIG. 5 corresponds to the cross sectional view along a line V-V in FIG. 4, FIG. 6 corresponds to the cross sectional view along a line VI-VI in FIG. 4, and FIG. 7 corresponds to the cross sectional view along a line VII-VII in FIG. 4. The shielded flat cable 1 connected to the circuit board is an example of a shielded flat cable with a circuit board.

A circuit board 900, which is an example of the circuit board to which the shielded flat cable 1 is connected, includes a first insulating layer 910, a ground layer 920, and a second insulating layer 930. The ground layer 920 is provided on the first insulating layer 910, and the second insulating layer 930 is provided on the ground layer 920. A groove for receiving and accommodating a portion of the shielded flat cable 1 is formed at an edge of the second insulating layer 930, and an adhesive 990 is provided inside the groove.

A first signal pattern 941, a second signal pattern 942, a third signal pattern 943, a fourth signal pattern 944, a first ground pattern 951, a second ground pattern 952, and a third ground pattern 953 are provided on the second insulating layer 930. The second ground pattern 952, the first signal pattern 941, the second signal pattern 942, the first ground pattern 951, the third signal pattern 943, the fourth signal pattern 944, and the third ground pattern 953 are disposed in this order from the X2-side toward the X1-side along the edge where the groove is formed. As illustrated in FIG. 5, the first ground pattern 951 is electrically connected to the ground layer 920 through a conductive via 921 provided in the second insulating layer 930. As illustrated in FIG. 7, the third ground pattern 953 is electrically connected to the ground layer 920 through a conductive via 923 provided in the second insulating layer 930. Similarly, the second ground pattern 952 is electrically connected to the ground layer 920 through a conductive via (not illustrated) provided in the second insulating layer 930.

The insulating protective layer 70, the shielding layer 30, the first intervention 41, the second intervention 42, the third intervention 43, the fourth intervention 44, and the insulating layer 20 are removed at one end of the shielded flat cable 1. As a result, ends of the first ground line 210, the second ground line 220, the third ground line 230, the first signal line 110, the second signal line 120, the third signal line 130, and the fourth signal line 140 become exposed. The insulating protective layer 70 is removed further, to also expose ends of the first shielding layer 31 and the second shielding layer 32.

Then, the second shielding layer 32 is connected to the ground layer 920. In addition, the first signal line 110 is connected to the first signal pattern 941, the second signal line 120 is connected to the second signal pattern 942, the third signal line 130 is connected to the third signal pattern 943, and the fourth signal line 140 is connected to the fourth signal pattern 944. Further, the first ground line 210 is connected to the first ground pattern 951, the second ground line 220 is connected to the second ground pattern 952, and the third ground line 230 is connected to the third ground pattern 953.

The connection between the shielded flat cable 1 and the circuit board 900 is made using a bonding material, such as solder, a conductive adhesive, or the like. For example, as illustrated in FIG. 5 and FIG. 7, the first ground line 210 is bonded to the first ground pattern 951 using a bonding material 971, and the third ground line 230 is bonded to the third ground pattern 953 using a bonding material 973. Similarly, the second ground line 220 is bonded to the second ground pattern 952 using a bonding material (not illustrated). Moreover, as illustrated in FIG. 6, the first signal line 110 is bonded to the first signal pattern 941 using a bonding material 961. Similarly, the second signal line 120, the third signal line 130, and the fourth signal line 140 are bonded to the second signal pattern 942, the third signal pattern 943, and the fourth signal pattern 944, respectively, using a bonding material (not illustrated). The illustration of the bonding materials 961, 971, and 973 and the resin 980 is omitted in FIG. 4.

The first signal line 110, the second signal line 120, the third signal line 130, and the fourth signal line 140 are preferably connected linearly with respect to the first signal pattern 941, the second signal pattern 942, the third signal pattern 943, and the fourth signal pattern 944, respectively. Preferably, the exposed portions of the first signal line 110, the second signal line 120, the third signal line 130, and the fourth signal line 140, exposed from the insulating protective layer 70, do not include bent portions. Because the first signal line 110 and the second signal line 120 included in the first differential signal line pair 11 are connected linearly with respect to the first signal pattern 941 and the second signal pattern 942, respectively, a variation in a characteristic impedance at the connecting portions can be reduced, and as a result, it is possible to reduce a reflection loss and reduce a signal deterioration. Similarly, because the third signal line 130 and the fourth signal line 140 included in the second differential signal line pair 12 are connected linearly with respect to the third signal pattern 943 and the fourth signal pattern 944, respectively, a variation in the characteristic impedance at the connecting portions can be reduced, thereby making it possible to reduce the reflection loss and reduce the signal deterioration.

In addition, the first ground line 210, the second ground line 220, and the third ground line 230 are preferably connected linearly with respect to the first ground pattern 951, the second ground pattern 952, and the third ground pattern 953, respectively. Preferably, the exposed portions of the first ground line 210, the second ground line 220, and the third ground line 230, exposed from the insulating protective layer 70, do not include bent portions. Because the first ground line 210, the second ground line 220, and the third ground line 230 are connected linearly with respect to the first ground pattern 951, the second ground pattern 952, and the third ground pattern 953, respectively, a variation in the characteristic impedance at the connecting portions can be reduced, and as a result, it is possible to reduce the reflection loss and reduce the signal deterioration.

As illustrated in FIG. 6, the exposed portions of the first signal line 110 exposed from the insulating protective layer 70, and the bonding material 961 are covered by a resin 980 having a low dielectric constant. The dielectric constant of the resin 980 is greater than or equal to 2.0, and less than or equal to 2.6, and preferably greater than or equal to 2.1, and less than or equal to 2.5, for example. The resin 980 is an acryl-based ultraviolet curing resin or a bismaleimide-based ultraviolet curing resin, for example. According to this configuration, a variation in the impedance can be reduced. Although not illustrated, a similar configuration is employed for the second signal line 120, third signal line 130, and fourth signal line 140. The illustration of the resin 980 is omitted in FIG. 4.

As illustrated in FIG. 5 and FIG. 7, the exposed portion of the first ground line 210 exposed from the insulating protective layer 70, the exposed portion of the third ground line 230 exposed from the insulating protective layer 70, and the bonding materials 971 and 973 are covered by the resin 980 having the low dielectric constant. According to this configuration, a variation in the impedance can be reduced. Although not illustrated, a similar configuration is employed for the second ground line 220.

A potential generated on the first ground line 210 is released to the first ground pattern 951, a potential generated on the second ground line 220 is released to the second ground pattern 952, and a potential generated on the third ground line 230 is released to the third ground pattern 953.

An impedance of the first differential signal line pair 11 is adjusted by the first intervention 41 and the second intervention 42. In addition, an impedance of the second differential signal line pair 12 is adjusted by the third intervention 43 and the fourth intervention 44.

In the shielded flat cable 1, the width WG1 of the first ground line 210 is greater than the width WS1 of the first signal line 110, the width WS2 of the second signal line 120, the width WS3 of the third signal line 130, and the width WS4 of the fourth signal line 140. For this reason, a ground potential of the first ground line 210 becomes stable, and a crosstalk between the first differential signal line pair 11 and the second differential signal line pair 12 can be reduced even in the high-frequency range.

Moreover, the width WG2 of the second ground line 220 is greater than the width WS1 of the first signal line 110, and the width WS2 of the second signal line 120. For this reason, the ground potential of the second ground line 220 becomes stable, and the effects of external noise on the first differential signal line pair 11 can be reduced even in the high-frequency range.

Further, the width WG3 of the third ground line 230 is greater than the width WS3 of the third signal line 130, and the width WS4 of the fourth signal line 140. For this reason, the ground potential of the third ground line 230 becomes stable, and the effects of external noise on the second differential signal line pair 12 can be reduced in the high-frequency range.

In the shielded flat cable 1, the first shielding layer 31 is connected to the first ground line 210 through the first opening 51. Hence, the ground potential of the first ground line 210 can be stabilized without contacting the second shielding layer 32 with the first ground line 210. Because it is unnecessary to perform a process on the second insulating layer 22 in order to connect the second shielding layer 32 to the first ground line 210, it is possible to reduce the number of processes and the cost required to manufacture the shielded flat cable 1.

In addition, the second shielding layer 32 is connected to the second ground line 220 through the second opening 52. Hence, the ground potential of the second ground line 220 can be stabilized without contacting the first shielding layer 31 with the second ground line 220. Because it is unnecessary to perform a process on the first insulating layer 21 in order to connect the first shielding layer 31 to the second ground line 220, it is possible to reduce the number of processes and the cost required to manufacture the shielded flat cable 1.

Similarly, the second shielding layer 32 is connected to the third ground line 230 through the fourth opening 54. Hence, the ground potential of the third ground line 230 can be stabilized without contacting the first shielding layer 31 with the third ground line 230. Because it is unnecessary to perform a process on the first insulating layer 21 in order to connect the first shielding layer 31 to the third ground line 230, it is possible to reduce the number of processes and the cost required to manufacture the shielded flat cable 1.

The width WG1 of the first ground line 210 and the width WG2 of the second ground line 220 are preferably greater than the width WT1 of the first differential signal line pair 11. When this relationship stands, the ground potentials of the first ground line 210 and the second ground line 220 can easily be stabilized. For this reason, the crosstalk between the first differential signal line pair 11 and the second differential signal line pair 12 can easily be reduced, and the effects of the external noise on the first differential signal line pair 11 can easily be reduced. Moreover, when manufacturing the shielded flat cable 1, the first shielding layer 31 can easily be made to contact the first ground line 210, and the second shielding layer 32 can easily be made to contact the second ground line 220. The width WT1 of the first differential signal line pair 11 is the distance between the fourth surface 114 of the first signal line 110, and the third surface 123 of the second signal line 120.

Similarly, the width WG1 of the first ground line 210 and the width WG3 of the third ground line 230 are preferably greater than the width WT2 of the second differential signal line pair 12. When this relationship stands, the ground potentials of the first ground line 210 and the third ground line 230 can easily be stabilized. For this reason, the crosstalk between the first differential signal line pair 11 and the second differential signal line pair 12 can easily be reduced, and the effects of the external noise on the second differential signal line pair 12 can easily be reduced. In addition, when manufacturing the shielded flat cable 1, the first shielding layer 31 can easily be made to contact the first ground line 210, and the second shielding layer 32 can easily be made to contact the third ground line 230. The width WT2 of the second differential signal line pair 12 is the distance between the fourth surface 134 of the third signal line 130, and the third surface 143 of the fourth signal line 140.

A distance LTG1 between the first differential signal line pair 11 and the first ground line 210, and a distance LTG2 between the first differential signal line pair 11 and the second ground line 220, are preferably greater than a distance LSS1 between the first signal line 110 and the second signal line 120. When this relationship stands and the shielded flat cable 1 is manufactured, the first shielding layer 31 can easily be made to contact the first ground line 210, and the second shielding layer 32 can easily be made to contact the second ground line 220. The distance LTG1 between the first differential signal line pair 11 and the first ground line 210, is the distance between the third surface 123 of the second signal line 120 and the fourth surface 214 of the first ground line 210. The distance LTG2 between the first differential signal line pair 11 and the second ground line 220, is the distance between the fourth surface 114 of the first signal line 110 and the third surface 223 of the second ground line 220.

A distance LTG3 between the second differential signal line pair 12 and the first ground line 210, and a distance LTG4 between the second differential signal line pair 12 and the third ground line 230, is preferably greater than a distance LSS2 between the third signal line 130 and the fourth signal line 140. When this relationship stands and the shielded flat cable 1 is manufactured, the first shielding layer 31 can easily be made to contact the first ground line 210, and the second shielding layer 32 can easily be made to contact the third ground line 230. The distance LTG3 between the second differential signal line pair 12 and the first ground line 210, is the distance between the fourth surface 134 of the third signal line 130 and the third surface 213 of the first ground line 210. The distance LTG4 between the second differential signal line pair 12 and the third ground line 230, is the distance between the third surface 143 of the fourth signal line 140 and the fourth surface 234 of the third ground line 230.

The width WT1 of the first differential signal line pair 11 is preferably greater than the distance LTG1 between the first differential signal line pair 11 and the first ground line, and greater than the distance LTG2 between the first differential signal line pair 11 and the second ground line 220. When this relationship stands, the crosstalk between the first differential signal line pair 11 and the second differential signal line pair 12 can easily be reduced, and the effects of the external noise on the first differential signal line pair 11 can easily be reduced.

Similarly, the width WT2 of the second differential signal line pair 12 is preferably greater than the distance LTG3 between the second differential signal line pair 12 and the first ground line, and greater than the distance LTG4 between the second differential signal line pair 12 and the third ground line 230. When this relationship stands, the crosstalk between the first differential signal line pair 11 and the second differential signal line pair 12 can easily be reduced, and the effects of the external noise on the second differential signal line pair 12 can easily be reduced.

The width WG1 of the first ground line 210 is preferably greater than the distance LTG1 between the first differential signal line pair 11 and the first ground line 210, and the width WG2 of the second ground line 220 is preferably greater than the distance LTG2 between the first differential signal line pair 11 and the second ground line 220. When this relationship stands, the ground potentials of the first ground line 210 and the second ground line 220 can easily be stabilized. For this reason, the crosstalk between the first differential signal line pair 11 and the second differential signal line pair 12 can easily be reduced, and the effects of the external noise on the first differential signal line pair 11 can easily be reduced. When manufacturing the shielded flat cable 1, the first shielding layer 31 can easily be made to contact the first ground line 210, and the second shielding layer 32 can easily be made to contact the second ground line 220. The width WG1 is more preferably greater than or equal to 1.4 times the distance LTG1, and width WG2 is more preferably greater than or equal to 1.4 times the distance LTG2.

The width WG1 of the first ground line 210 is preferably greater than the distance LTG3 between the second differential signal line pair 12 and the first ground line 210, and the width WG3 of the third ground line 230 is preferably greater than the distance LTG4 between the second differential signal line pair 12 and the third ground line 230. When this relationship stands, the ground potentials of the first ground line 210 and the third ground line 230 can easily be stabilized. For this reason, the crosstalk between the first differential signal line pair 11 and the second differential signal line pair 12 can easily be reduced, and the effects of the external noise on the second differential signal line pair 12 can easily be reduced. When manufacturing the shielded flat cable 1, the first shielding layer 31 can easily be made to contact the first ground line 210, and the second shielding layer 32 can easily be made to contact the third ground line 230. The width WG3 is more preferably greater than or equal to 1.4 times the distance LTG3.

The width WG1 of the first ground line 210, and the width WG2 of the second ground line 220, are preferably smaller than the width WI1 of the first intervention 41 and the width WI2 of the second intervention 42. When this relationship stands, it is possible to easily adjust the impedance of the first differential signal line pair 11.

The width WG1 of the first ground line 210 and the width WG3 of the third ground line 230, are preferably smaller than the width WI3 of the third intervention 43 and the width WI4 of the fourth intervention 44. When this relationship stands, it is possible to easily adjust the impedance of the second differential signal line pair 12.

When the desired impedance can be obtained, the first intervention 41, the second intervention 42, the third intervention 43, and the fourth intervention 44 may be omitted.

Second Embodiment

Figure 8:
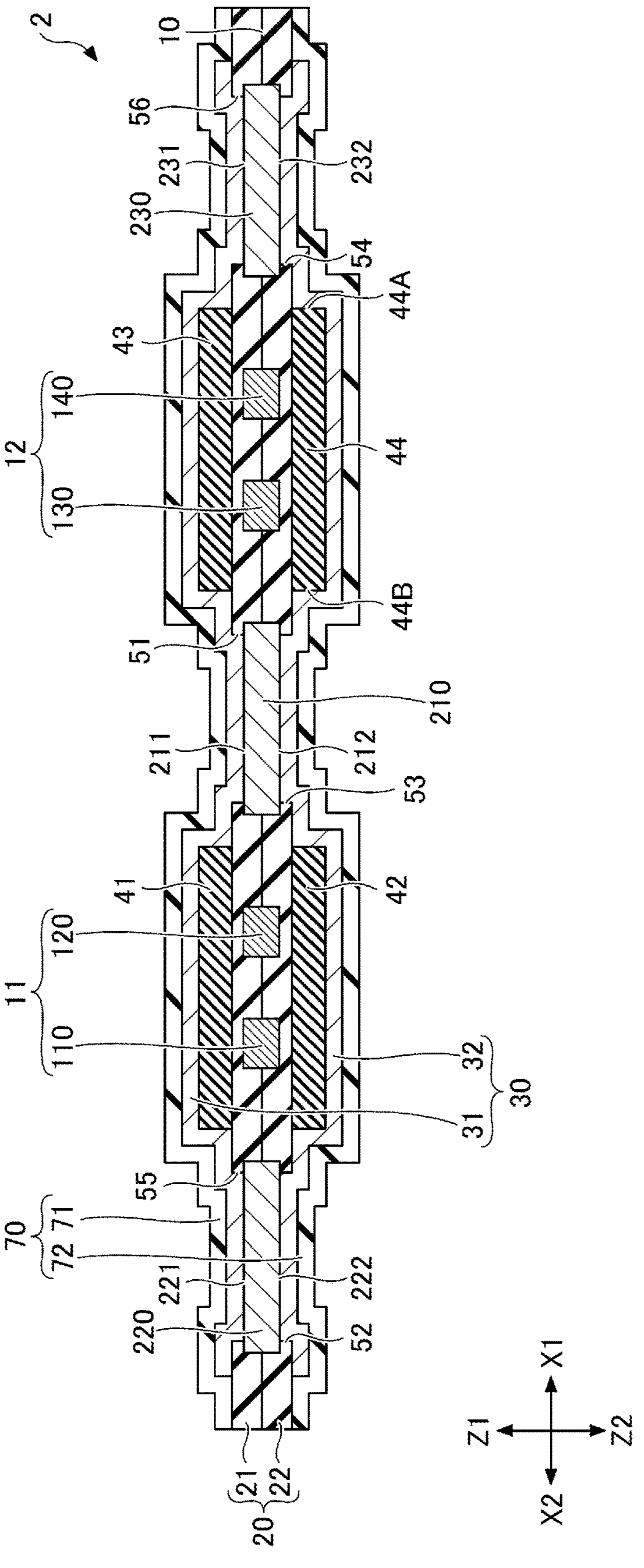
FIG. 8 is a cross sectional view illustrating the shielded flat cable according to a second embodiment.

A second embodiment will be described. FIG. 8 is a cross sectional view illustrating the shielded flat cable according to a second embodiment. Similar to FIG. 2, FIG. 8 corresponds to the cross sectional view along the line II-II in FIG. 1.

As illustrated in FIG. 8, in a shielded flat cable 2 according to the second embodiment, a third opening 53 reaching the first ground line 210 is formed in the second insulating layer 22, in addition to the second opening 52 and the fourth opening 54. The third opening 53 extends in the Y1-Y2 direction, and is formed in a groove shape. The second surface 212 of the first ground line 210 is exposed through the third opening 53. The second shielding layer 32 is connected to the first ground line 210 through the third opening 53. The conductive adhesive layer 32A of the second shielding layer 32 makes contact with the first ground line 210.

A fifth opening 55 reaching the second ground line 220, and a sixth opening 56 reaching the third ground line 230, is famed in the first insulating layer 21, in addition to the first opening 51. The fifth opening 55 and the sixth opening 56 extend in the Y1-Y2 direction, are formed in a groove shape. The first surface 221 of the second ground line 220 is exposed through the fifth opening 55. The first shielding layer 31 is connected to the second ground line 220 through the fifth opening 55. The conductive adhesive layer 31A of the first shielding layer 31 makes contact with the second ground line 220. The sixth opening 56 exposes the first surface 221 of the third ground line 230. The first shielding layer 31 is connected to the third ground line 230 through the sixth opening 56. The conductive adhesive layer 31A of the first shielding layer 31 makes contact with the third ground line 230.

Otherwise, the configuration of the second embodiment is similar to that of the first embodiment.

Similar to the first embodiment, the second embodiment can reduce the effects of the external noise and the crosstalk even in the high-frequency range.

Third Embodiment

Figure 9:
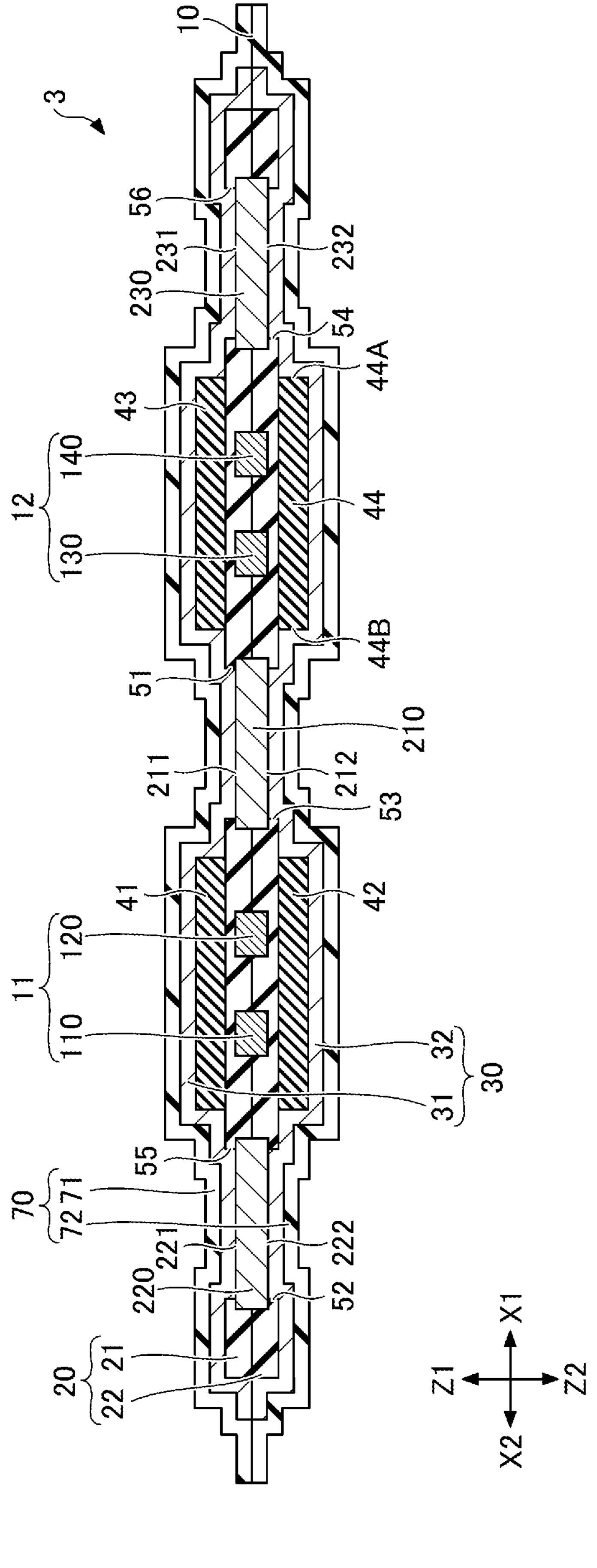
FIG. 9 is a cross sectional view illustrating the shielded flat cable according to a third embodiment.

A third embodiment will be described. FIG. 9 is a cross sectional view illustrating the shielded flat cable according to a third embodiment. Similar to FIG. 2, FIG. 9 corresponds to the cross sectional view along the line II-II in FIG. 1.

As illustrated in FIG. 9, in a shielded flat cable 3 according to the third embodiment, the first shielding layer 31 and the second shielding layer 32 protrude from both ends of the insulating layer 20 in the X1-X2 direction, and are bonded to each other at the protruding ends thereof. The first insulating protective layer 71 and the second insulating protective layer 72 extend from both ends of the shielding layer 30 in the X1-X2 direction, and are bonded to each other at the protruding ends thereof.

Otherwise, the configuration of the third embodiment is similar to that of the second embodiment.

Similar to the second embodiment, the third embodiment can reduce the effects of the external noise and the crosstalk even in the high-frequency range. In addition, the third embodiment can obtain a higher shielding effect compared to the second embodiment.

Similar to the first embodiment, the fifth opening 55 and the sixth opening 56 in the first insulating layer 21 may be omitted, and the third opening 53 in the second insulating layer 22 may be omitted.

Fourth Embodiment

Figure 10:
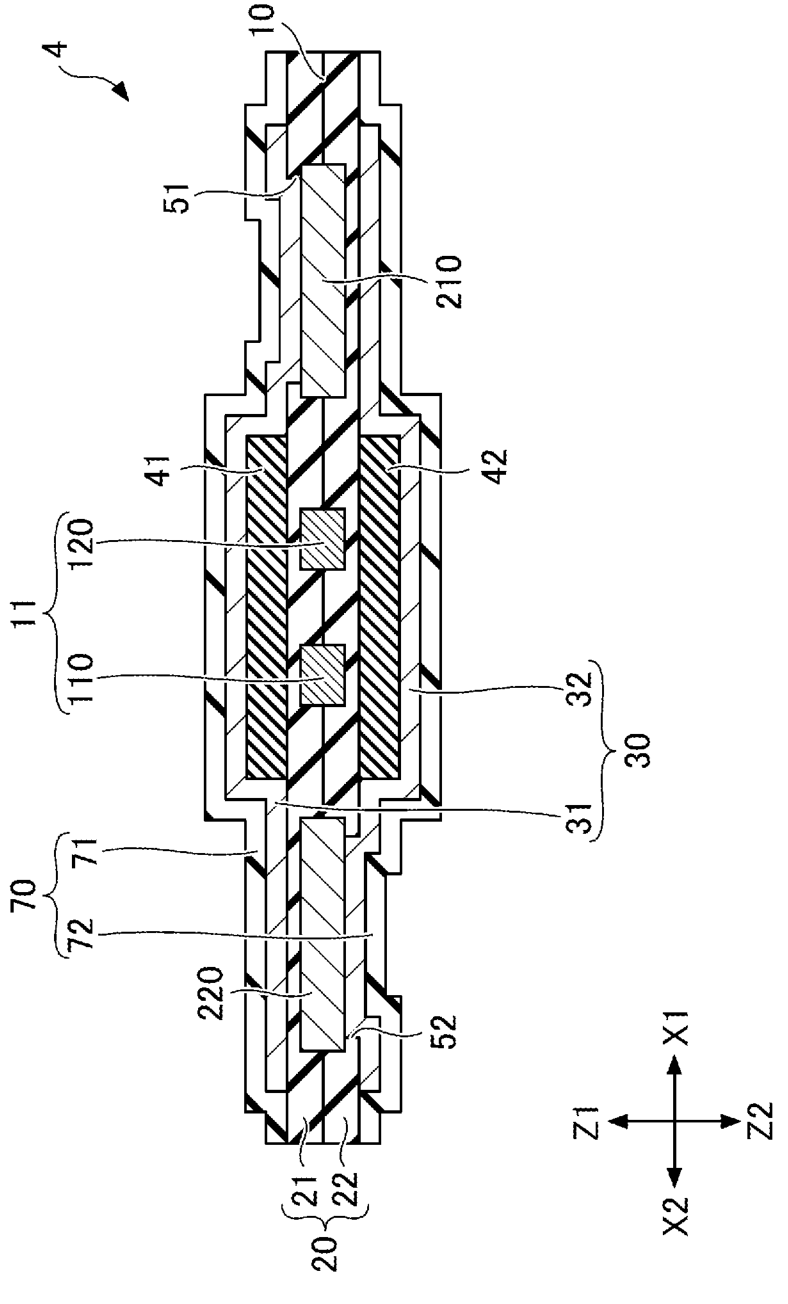
FIG. 10 is a cross sectional view illustrating the shielded flat cable according to a fourth embodiment.

A fourth embodiment will be described. FIG. 10 is a cross sectional view illustrating the shielded flat cable according to a fourth embodiment. Similar to FIG. 2, FIG. 10 corresponds to the cross sectional view along the line II-II in FIG. 1.

As illustrated in FIG. 10, a shielded flat cable 4 according to the fourth embodiment does not include the second differential signal line pair 12 and the third ground line 230, and the dimensions in the X1-X2 direction are smaller by an amount corresponding to the omitted elements.

Otherwise, the configuration of the fourth embodiment is similar to that of the first embodiment.

In the fourth embodiment, no crosstalk occurs within the shielded flat cable 4. Similar to the first embodiment, it is possible to reduce the effects of the external noise on the first differential signal line pair 11.

Similar to the second embodiment, an opening reaching the second ground line 220 may be formed in the first insulating layer 21, and an opening reaching the first ground line 210 may be formed in the second insulating layer 22.

Fifth Embodiment

Figure 11:
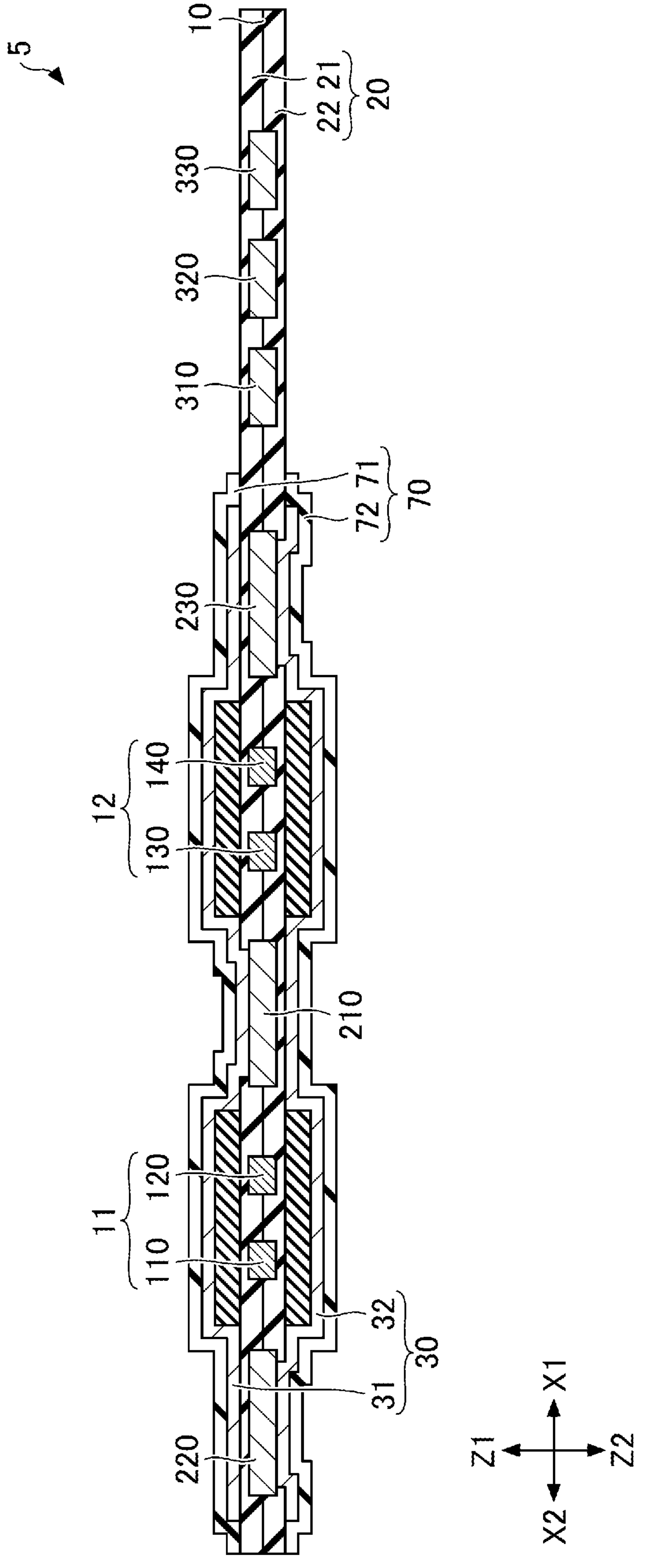
FIG. 11 is a cross sectional view illustrating the shielded flat cable according to a fifth embodiment.

A fifth embodiment will be described. FIG. 11 is a cross sectional view illustrating the shielded flat cable according to a fifth embodiment. Similar to FIG. 2, FIG. 11 corresponds to the cross sectional view along the line II-II in FIG. 1.

As illustrated in FIG. 11, a shielded flat cable 5 according to the fifth embodiment includes a first power line 310, a second power line 320, and a third power line 330. The first power line 310, the second power line 320, and the third power line 330 extend in the Y1-Y2 direction, and arranged in the X1-X2 direction on the virtual plane 10.

The first power line 310 is located on the X1-side of the third ground line 230, the second power line 320 is located on the X1-side of the first power line 310, and the third power line 330 is located on the X1-side of the second power line 320. The first power line 310, the second power line 320, and the third power line 330 are made of annealed copper with a tin-plated layer formed on the surface thereof. The first power line 310, the second power line 320, and the third power line 330 are rectangular conductors, for example. The first power line 310, the second power line 320, and the third power line 330 are used to transmit power.

The first power line 310, the second power line 320, and the third power line 330 are covered by the insulating layer 20. The shielding layer 30 and the insulating protective layer 70 may not necessarily cover the first power line 310, the second power line 320, and the third power line 330.

Otherwise, the configuration of the fifth embodiment is similar to that of the first embodiment.

Similar to the first embodiment, the fifth embodiment can reduce the effects of the external noise and the crosstalk even in the high-frequency range.

Similar to the second embodiment, a fifth opening 55 and a sixth opening 56 may be formed in the first insulating layer 21, and a third opening 53 may be famed in the second insulating layer 22.

Sixth Embodiment

Figure 12:
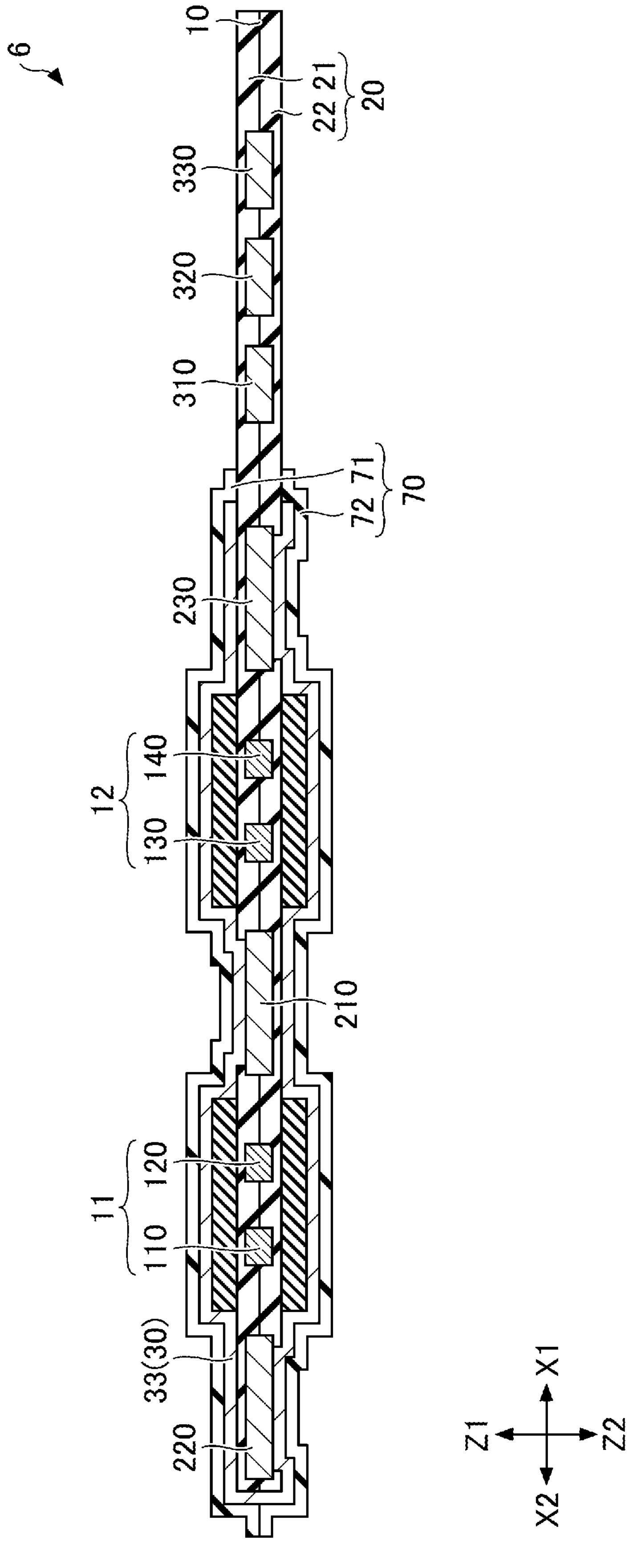
FIG. 12 is a cross sectional view illustrating the shielded flat cable according to the sixth embodiment.

A sixth embodiment will be described. FIG. 12 is a cross sectional view illustrating the shielded flat cable according to the sixth embodiment. Similar to FIG. 2, FIG. 12 corresponds to the cross sectional view along the line II-II in FIG. 1.

As illustrated in FIG. 12, in a shielded flat cable 6 according to the sixth embodiment, the shielding layer 30 is formed of a single third shielding layer 33. The third shielding layer 33 covers the surface of the first insulating layer 21 on the Z1-side, and the surface of the second insulating layer 22 on the Z2-side, via the ends of the first insulating layer 21 and the second insulating layer 22 on the X2-side. In addition, the first insulating protective layer 71 and the second insulating protective layer 72 protrude from the third shielding layer 33 on the X2-side, and are bonded to each other at the protruding ends thereof.

Otherwise, the configuration of the sixth embodiment is similar to that of the fifth embodiment.

According to the sixth embodiment, it is possible to obtain the effects similar to those obtainable by the fifth embodiment. In addition, according to the sixth embodiment, an even more excellent shielding effect can be obtained at the end on the X2-side.

In each of the embodiments described above, the connection of the signal line to the circuit board 900 is not limited to the connection described above.

For example, on the Z1-side of the first signal line 110, a portion of the first insulating protective layer 71 may remain at a tip end of the shielded flat cable 1. Further, on the Z2-side of the first signal line 110, the second insulating protective layer 72 may remain without being removed. The same applies to the second signal line 120, third signal line 130, and fourth signal line 140.

In the present disclosure, the ground lines and the signal lines are not limited to the rectangular or round conductors. For example, the cross sectional shapes of the ground lines and signal lines, along a plane perpendicular to the longitudinal direction of these lines, may have an oval shape, other polygonal shapes, or the like.

According to the present disclosure, it is possible to reduce the effects of the external noise and the crosstalk even in the high-frequency range.

Although the embodiments are numbered with, for example, “first,” “second,” “third,” “fourth,” “fifth,” or “sixth,” the ordinal numbers do not imply priorities of the embodiments. Many other variations and modifications will be apparent to those skilled in the art.

The present disclosure is not limited to the specific embodiments of the shielded flat cable and the shielded flat cable with the circuit board described in detail above, and various variations, modifications, substitutions, additions, deletions, and combinations may be made within the scope of the present disclosure.

What is claimed is:

1. A shielded flat cable comprising:
a first differential signal line pair including a first signal line and a second signal line that are parallel to each other;
a first ground line parallel to the first differential signal line pair;
a second ground line parallel to the first differential signal line pair, such that the first differential signal line pair is arranged between the first ground line and the second ground line, the first signal line is adjacent to the second ground line, and the second signal line is adjacent to the first ground line;
an insulating layer covering the first differential signal line pair, the first ground line, and the second ground line;
a first shielding layer covering a first surface of the insulating layer; and
a second shielding layer covering a second surface of the insulating layer, opposite to the first surface, wherein
the insulating layer includes a first opening exposing the first ground line at the first surface of the insulating layer,
the first shielding layer is electrically connected to the first ground line through the first opening, and
a width of the first ground line is greater than a width of the first signal line and a width of the second signal line.

2. The shielded flat cable as claimed in claim 1, wherein the first ground line entirely overlaps the second shielding layer through the insulating layer at the second surface of the insulating layer.

3. The shielded flat cable as claimed in claim 1, wherein
the insulating layer includes a second opening exposing the second ground line at the second surface of the insulating layer,
the second shielding layer is electrically connected to the second ground line through the second opening, and
the second ground line entirely overlaps the first shielding layer through the insulating layer at the first surface of the insulating layer.

4. The shielded flat cable as claimed in claim 1, wherein
the insulating layer includes a third opening exposing the first ground line at the second surface of the insulating layer, and
the second shielding layer is electrically connected to the first ground line through the third opening.

5. The shielded flat cable as claimed in claim 1, wherein
the insulating layer includes a second opening exposing the second ground line at the second surface of the insulating layer,
the second shielding layer is electrically connected to the second ground line through the second opening,
the second ground line entirely overlaps the first shielding layer through the insulating layer at the first surface of the insulating layer,
the insulating layer includes a third opening exposing the first ground line at the second surface of the insulating layer, and
the second shielding layer is electrically connected to the first ground line through the third opening.

6. The shielded flat cable as claimed in claim 1, wherein
the first shielding layer and the second shielding layer protrude from at least one end of the insulating layer in a cross sectional view along a plane perpendicular to a longitudinal direction, and
the first shielding layer and the second shielding layer are bonded to each other at protruding ends thereof.

7. The shielded flat cable as claimed in claim 1, wherein the width of the first ground line is greater than a width of the first differential signal line pair.

8. The shielded flat cable as claimed in claim 1, wherein a distance between the first differential signal line pair and the first ground line is greater than a distance between the first signal line and the second signal line.

9. The shielded flat cable as claimed in claim 1, wherein a width of the first differential signal line pair is greater than a distance between the first differential signal line pair and the first ground line.

10. The shielded flat cable as claimed in claim 1, wherein the width of the first ground line is greater than a distance between the first differential signal line pair and the first ground line.

11. A shielded flat cable comprising:
a first differential signal line pair including a first signal line and a second signal line that are parallel to each other;
a first ground line parallel to the first differential signal line pair;
a second ground line parallel to the first differential signal line pair, so that the first differential signal line pair is arranged between the first ground line and the second ground line;
an insulating layer covering the first differential signal line pair, the first ground line. and the second ground line;
a first shielding layer covering a first surface of the insulating layer;
an intervention arranged between the first shielding layer and the insulating layer; and
a second shielding layer covering a second surface of the insulating layer, opposite to the first surface, wherein
the insulating layer includes a first opening exposing the first ground line at the first surface of the insulating layer,
the first shielding layer is electrically connected to the first ground line through the first opening,
a width of the first ground line is greater than a width of the first signal line and a width of the second signal line,
the intervention is parallel to the first differential signal line pair and overlaps the first differential signal line pair in a plan view, and
the width of the first ground line is smaller than a width of the intervention.

12. The shielded flat cable as claimed in claim 1, further comprising:
a second differential signal line pair including a third signal line and a fourth signal line that are parallel to the first differential signal line pair, wherein
the insulating layer covers the second differential signal line pair, and
the first ground line is disposed between the first differential signal line pair and the second differential signal line pair.

13. A shielded flat cable with a circuit board, comprising:
the shielded flat cable as claimed in claim 1;
the circuit board to which an end of the shielded flat cable is connected, and including a first ground pattern to which the first ground line is electrically connected, a second ground pattern to which the second ground line is electrically connected, and a first signal pattern and a second signal pattern to which the first differential signal line pair is electrically connected; and a resin covering the first ground line, the second ground line, and the first differential signal line pair exposed from the insulating layer at the end of the shielded flat cable, wherein a dielectric constant of the resin is greater than or equal to 2.0, and less than or equal to 2.6.

14. The shielded flat cable with the circuit board as claimed in claim 13, wherein the first differential signal line pair exposed from the insulating layer is connected linearly with respect to the first signal pattern and the second signal pattern.

15. The shielded flat cable with the circuit board as claimed in claim 13, wherein the first ground line exposed from the insulating layer is connected linearly with respect to the first ground pattern.

16. A shielded flat cable comprising:

a first differential signal line pair including a first signal line and a second signal line that are parallel to each other;

a second differential signal line pair including a third signal line and a fourth signal line that are parallel to the first differential signal line pair;

a first ground line parallel to the first differential signal line pair;

a second ground line parallel to the first differential signal line pair;

an insulating layer covering the first differential signal line pair, the second differential signal line pair, the first ground line, and the second ground line; and a shielding layer covering the insulating layer, wherein the first differential signal line pair, the second differential signal line pair, the first ground line, and the second ground line are arranged on a virtual plane, the first ground line is disposed between the first differential signal line pair and the second differential signal line pair, the first differential signal line pair is disposed between the first ground line and the second ground line, the insulating layer includes a first opening reaching the first ground line, and a second opening reaching the second ground line, the first opening is formed only on one side of the first ground line along a first direction perpendicular to the virtual plane, a surface of the first ground line on the other side thereof along a second direction opposite to the first direction is entirely covered by the insulating layer, the second opening is formed only on one side of the second ground line along the second direction, a surface of the second ground line on the other side thereof along the first direction is entirely covered by the insulating layer, the shielding layer is electrically connected to the first ground line through the first opening, and electrically connected to the second ground line through the second opening, and a width of the first ground line and a width of the second ground line are greater than a width of the first signal line, a width of the second signal line, a width of the third signal line, and a width of the fourth signal line.

* * * * *